United States Patent [19]

Anderson

[11] Patent Number: 4,480,673
[45] Date of Patent: Nov. 6, 1984

[54] TIRE CHAIN DEVICE

[76] Inventor: Alan M. Anderson, 701 N. Shore Dr., Hastings, Nebr. 68901

[21] Appl. No.: 498,458

[22] Filed: May 26, 1983

[51] Int. Cl.³ .......................... B60C 27/06; G09F 7/00
[52] U.S. Cl. ........................................ 152/216; 24/24; 40/591; 116/63 T; 152/219; 152/241; 152/242
[58] Field of Search .................... 152/208, 213 R, 216, 152/213 A, 217, 218, 219, 220, 231, 239, 241, 242, 240; 116/63 P, 63 T, 28 R; 24/21, 23 R, 24, 68 CT, 69 TT; 40/591; 59/84, 85, 93

[56] References Cited

U.S. PATENT DOCUMENTS

| | | | |
|---|---|---|---|
| 2,176,631 | 10/1939 | Kunkle | 152/241 |
| 2,326,618 | 8/1943 | Carlson et al. | 152/242 |
| 2,450,042 | 9/1948 | Harold | 152/241 |
| 2,657,728 | 11/1953 | Jackson | 152/242 |
| 2,711,770 | 6/1955 | Conoscente et al. | 152/242 |
| 2,714,913 | 8/1955 | Behnke | 152/213 R |
| 2,735,472 | 2/1956 | Beery | 152/242 |
| 2,820,502 | 1/1958 | Spencer | 152/218 |
| 2,918,960 | 12/1959 | McGuinness | 152/233 |
| 2,996,094 | 8/1961 | McGuinness | 152/233 |
| 3,106,949 | 10/1963 | Timmons | 152/218 |
| 3,856,069 | 12/1974 | Giannone | 152/233 |
| 3,934,541 | 1/1976 | May et al. | 116/63 T |
| 3,970,132 | 7/1976 | Giannone | 152/233 |
| 4,173,244 | 11/1979 | Schultz | 152/218 |
| 4,323,103 | 4/1982 | Kim | 152/213 A |
| 4,403,565 | 9/1983 | Bleiweiss et al. | 116/63 T |

Primary Examiner—William A. Powell
Assistant Examiner—Thomas Bokan
Attorney, Agent, or Firm—E. Robert Newman

[57] ABSTRACT

A tire chain device of the type which has a rigid structure positioned on the inner side of the wheel upon which it is installed, said rigid structure being comprised of an adjustable length horizontal strap and two rigid depending straps pivoted from either end thereof in a manner that restricts pivoting more than 90°, the two ends of the horizontal strap of said inner structure being connected by two short cross links to an adjustable length outer strap, and the lower end of each depending strap being removably connected by two long cross links to a plurality of posts having expanded ends spaced along the exposed side of the outer strap. The outer strap is slotted near one end for vertical support of the inner structure in the formation of a warning triangle.

13 Claims, 5 Drawing Figures

TIRE CHAIN DEVICE

TECHNICAL FIELD

The present invention related generally to non-skid devices for tires, more commonly known as tire chains. More particularly the invention is related to tire chains comprised of one or more rigid members which serve the purpose of speeding up the installation of the tire chains, preempting any advantage in jacking up the vehicle and reducing the number of required cross links.

BACKGROUND ART

The following table includes a representative list of patents issued for tire chains which fall within the particular category of the present invention:

| U.S. Pat. No. | Patentee | Date Issued |
| --- | --- | --- |
| 2,176,631 | Kunkle | October 17, 1939 |
| 2,326,618 | Carlson, et al | August 10, 1943 |
| 2,450,042 | Harold | September 28, 1948 |
| 2,657,728 | Jackson | November 3, 1953 |
| 2,711,770 | Conoscente, et al | June 28, 1955 |
| 2,714,913 | Behnke | August 9, 1955 |
| 2,735,472 | Beery | February 21, 1956 |
| 2,820,502 | Spencer | January 21, 1958 |
| 2,918,960 | McGuinness | December 29, 1959 |
| 2,996,094 | McGuinness | August 15, 1961 |
| 3,106,949 | Timmons | October 16, 1963 |
| 3,856,069 | Giannone | December 24, 1974 |

Most of these inventions disclose rigid structure to be positioned on the inner side of the wheel for reducing the amount of manual activity required in that area. The present invention better accomplishes this end primarily through the application of a principal not found in the prior art. That principal is to position the structure on the inner side of the wheel by moving it in a somewhat horizontal direction from the rear of the wheel, as opposed to moving the rigid structure over the top of the wheel. To make this maneuver possible, a portion of the rigid structure is adapted to be pivoted upwardly before initiating the positioning maneuver and then to be pivoted downwardly after it has passed over the vehicle axle.

Installation from the rear is simpler and faster for several reasons. It can be substantially accomplished with one arm by gripping the portion of the rigid structure which does not pass over the axle, and there is generally more working space within most modern fenders behind the tire.

Of the patents listed above only U.S. Pat. No. 2,450,042 to Harold discloses structure which might be suitable for installation from the rear. However, the present invention comprises other features and additional structure which tailor it to installation from the rear.

DISCLOSURE OF THE INVENTION

To accomplish the aforesaid, a tire chain device is provided which comprises a rigid structure for positioning on the inner side of the wheel, in the form of an inverted letter "U", of which each leg may pivot inwardly only. A cross link connects each upper corner of the inverted "U" to a rigid strap to be horizontally positioned on the outer side of the wheel. In addition, two longer cross links connect each extremity of the depending legs of the "U" to posts affixed to the face of the second horizontal strap positioned on the outer side of the wheel. Both depending legs are pivoted in order that the device may be used on either the left or right side of the vehicle and the entire structure can be more fully collapsed for storage.

An additional advantage of the present invention over the prior art is that its unique structure is suited to provisions for adjustment to fit a large variety of tire sizes, both as to diameter and width. Another feature of the present invention is that each tire chain device may be formed into the shape of a warning triangle which will stand substantially vertically. One may be placed behind and one in front of a parked vehicle.

In addition to these advantages, it is an object of this invention to provide a tire chain device comprised of both rigid portions and chain portions which may be installed on tires of varying sizes without leaving any of the end portions of the chain links dangling free.

These and other objects, advantages, and novel features of the present invention will become apparent from the following detailed description of the invention when considered in conjunction with the accompanying drawings.

BEST MODE FOR CARRYING OUT THE INVENTION

Figure 1:
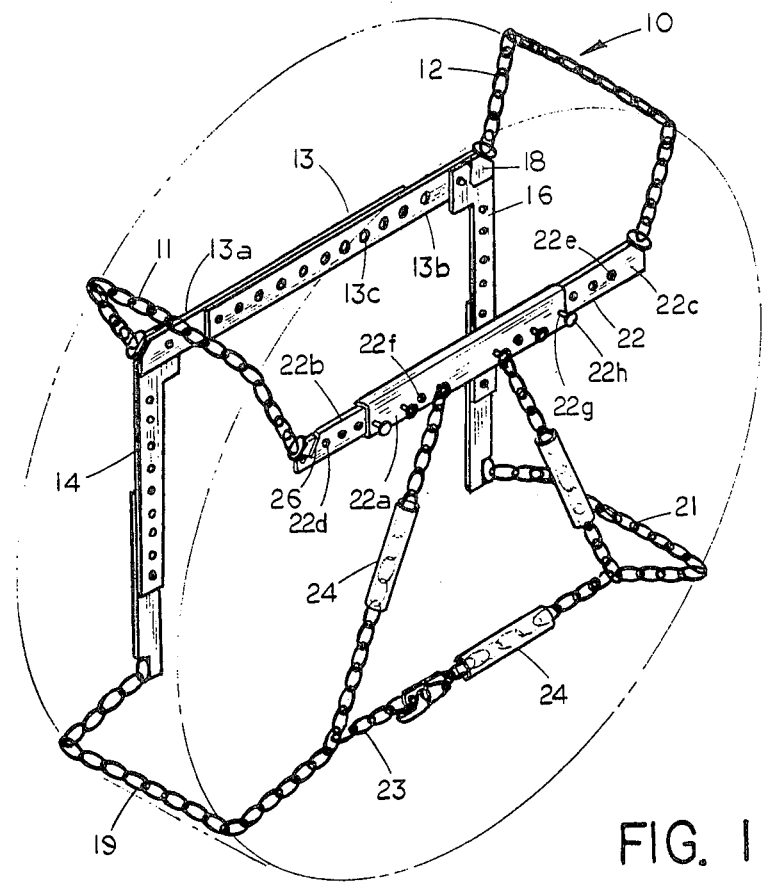
FIG. 1 is a perspective view of the tire chain device of the present invention shown in its installed conformation on a tire whose outline is depicted in phantom lines.
Figures 2, 3:
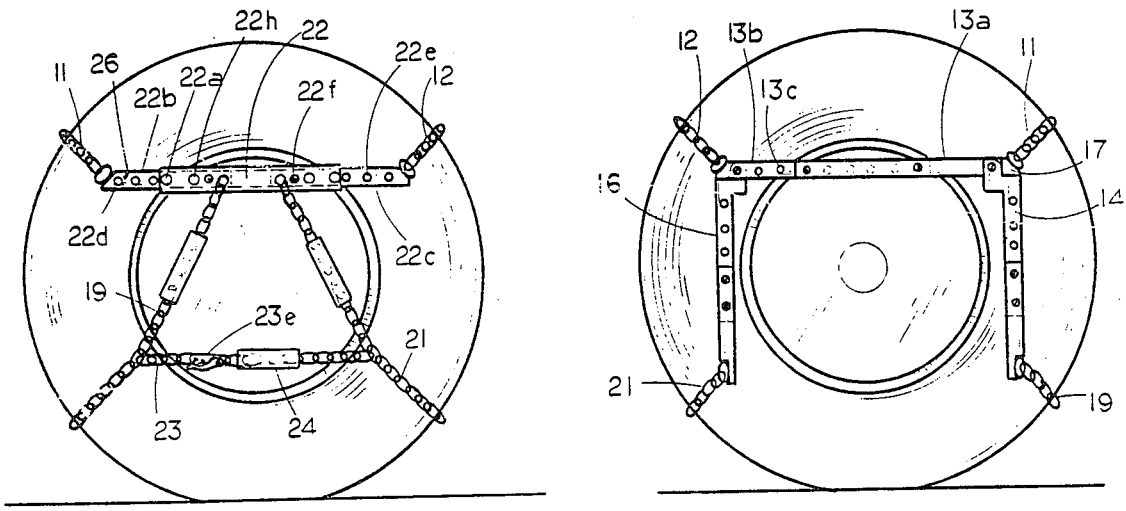
FIG. 2 is a reduced view of the outer side of a tire on which the tire chain device is installed.
FIG. 3 is a reduced view of the inner side of a tire on which the tire chain device is installed.

Referring now to the drawings, whereon like reference numerals designate identical or corresponding parts throughout the several views, and more particularly to FIG. 1, whereon the present invention is designated generally at 10. Short cross links 11 and 12 (see also FIGS. 2, 3 and 4) are positioned substantially atop either upper quarter of the tire. One end link of cross link 11 is connected to an upper corner of adjustable strap 13 and one end of cross link 12 is connected to the other upper corner of adjustable strap 13. Adjustable strap 13 is comprised of two segments, 13a and 13b, each having a plurality of evenly spaced apart, identically threaded holes 13c. Segments 13a and 13b are affixed to each other to permit the length of strap 13 to be adjusted by means of two allen screws which have a length approximately equal to the total thickness of segments 13a and 13b, and which are threaded for use in holes 13c.

Adjustable depending strap 14 is pivotally attached to one end of strap 13 and its counterpart, adjustable depending strap 16, is pivotally attached to the other end of strap 13. (See FIGS. 3 and 4 also). As can best be seen in FIG. 4, the upper end of straps 14 and 16 jog inwardly with respect to strap 13. Flat, substantially square projecting surfaces 17 and 18 of strap 13, in conjunction with the inward jogs of straps 14 and 16, respectively, (as best seen on FIG. 1) serve to limit the angular relationship between depending straps 14 and 16 and strap 13 to approximately 90° or less. The upper corner of each strap 14 and 16 which is adjacent to each projecting surface 17 and 18, respectively, is curved slightly to permit it to pivot adjacent thereto. As can be seen in the accompanying drawings, depending straps 14 and 16 have provisions for adjusting their lengths comparable in nature to those of strap 13. One end of long cross link 19 is connected to the free end of depending strap 14 and one end of long cross link 21 is connected to the free end of depending strap 16. Straps 13, 14 and 16 are positioned on the inner side of the wheel after the tire chain device is installed. The relative length of short cross links 11 and 12 and of long cross links 19 and 21 will be better understood after outer adjustable strap 22 is hereinafter described and the method of installing tire chain device 10 is hereinafter set forth.

Outer adjustable strap 22 is comprised of a central segment 22a having a hollow rectangular cross-section, and two end segments 22b and 22c which have cross-sections sized to slide within center segment 22a. End segments 22b and 22c have a plurality of evenly spaced identically threaded holes 22d and 22e, respectively (also see FIGS. 2 and 4). Symmetrically positioned upon one of the two vertical portions of center segment 22a are two holes 22f. They are threaded to cooperate with holes 22d and 22e. The overall length of outer strap 22 may be adjusted by repositioning end segments 22b and 22c within center segment 22a by means of two cooperatively threaded allen screws having a length approximately equal to the combined thickness of end segments 22b and 22c and the portion of center segment 22a having holes 22f. Ordinarily outer strap 22 and inner strap 13 will be adjusted to substantially the same length and the center segment 22a will be maintained in a centered position within outer strap 22.

Straps 14 and 16 will be adjusted to a length which is about two-thirds to three-fourths that of strap 13 or outer strap 22. The relative lengths of all of these rigid elements may be adjusted to comport with the diameter and width of the particular tire on which they are usually installed. The reason for the relative lengths of the various rigid elements of tire chain device 10 and the center position of segment 22a of outer strap 22 will be understood after its method of installation is set forth hereinbelow. Also a plurality of evenly spaced apart posts 22g having expanded ends 22h project from the same side of segment 22a in which holes 22f are located.

The end of short cross link 11 which is not connected to strap 13 is connected to an upper corner of outer strap 22 and the end of short cross link 12 which is not connected to strap 13 is connected to the other upper corner of strap 22. When straps 13, 14, and 16 have been positioned around the axle of the vehicle on the inner side of the wheel in a manner which will be explained hereinafter and cross links 11 and 12 are positioned substantially atop the tire, outer strap 22 will rest against the outer side of the tire at a location approximately opposite that of strap 13 on the inner side of the tire. The length of cross links 11 and 12 is such that strap 13 and 22 will rest approximately mid way between the center of the tire and its circumference when in this position. Then when long cross links 19 and 21 are pulled around the lower two quarters of the tire from where they are connected at the lower ends of depending straps 14 and 16, respectively, they can be pulled tight across the outer side of the wheel towards center segment 22a and the end link of each slipped over each of two spaced apart posts 22g on center segment 22a and retained thereon by expanded ends 22h.

Figure 4:
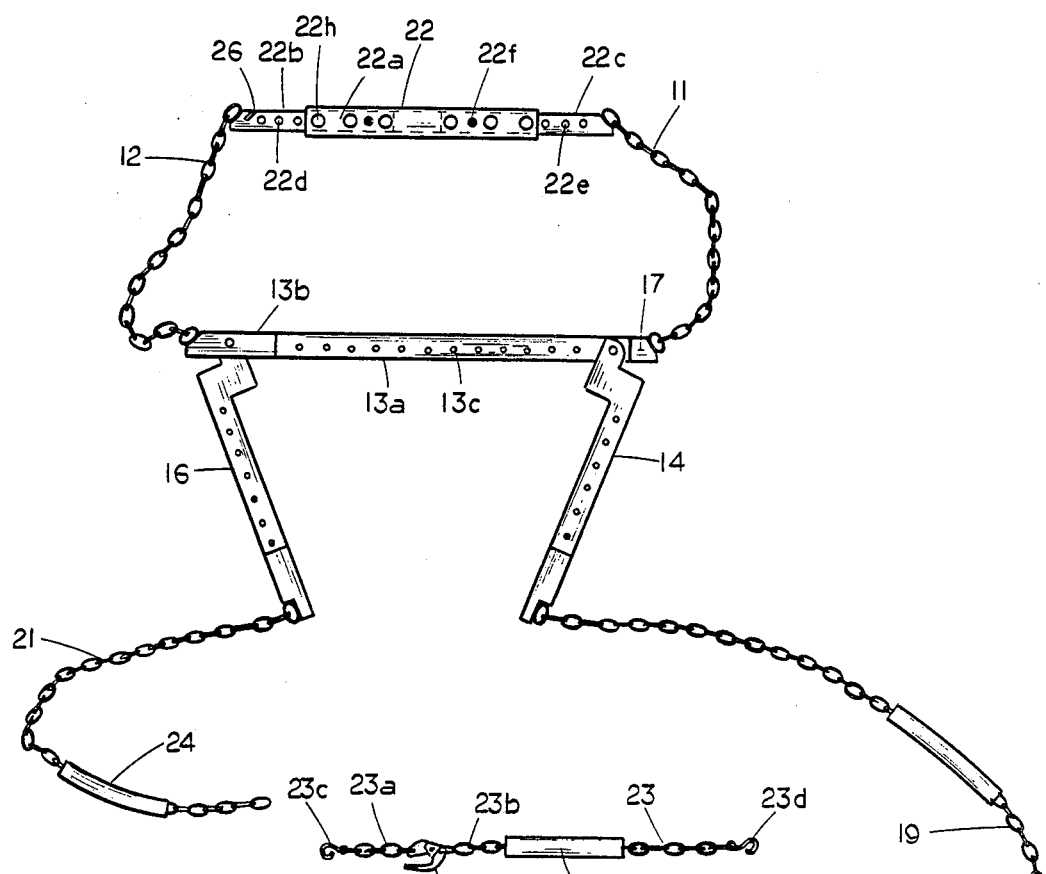
FIG. 4 is a view of the parts of the tire chain device shown spread out on a horizontal surface before installation.

As best disclosed in FIG. 4, tightener chain 23 is comprised of two halves, 23a and 23b. There is a hook 23c connected at one end of tightener half 23a and a hook 23d on one end of tightener chain half 23b. After long cross links 19 and 21 have been installed onto posts 22g, hook 23c is placed within a link of long cross link 19 and hook 23d is placed within an opposite link on long cross link 21. A conventional chain coupler 23e can then be closed to complete the installation of tire chain device 10 on the wheel.

The length of long cross links 19 and 21 is such that a tight installation of tire chain device 10 is possible on tires varying widely in size. Although not shown in the accompanying drawings, for smaller tires it is possible to cross long cross links 19 and 21 below center segment 22a and place the last links thereof on posts 22g oppositely located on center segment 22a. Of course it is presumed that the lengths of straps 13, 14, 16 and 22 have been adjusted to comport with whatever tire or range of tire sizes tire chain 10 will be installed on.

Having explained the method of completing the installation once straps 13, 14, 16 and 22 are substantially in place on the tire, I will now explain that part of the installation necessary to so position these straps. First, the length of the straps are adjusted to accommodate the particular size of tire upon which installation is to be made. If the installation is to be on the right rear tire, strap 16 is pivotted upwardly until its lower portion can be grasped along with strap 13 and depending strap 14 in the installer's left hand. Strap 22 is grasped in his right hand and all straps along with cross links 11 and 12 are slid from behind the tire over its top as a unit. After cross links 11 and 12 are each resting approximately across the middle of one of the two upper quarters of the tire and strap 13 and strap 22 are approximately horizontal and opposite each other on either side of the tire, strap 16 is dropped and permitted to pivot downwardly along the other side of the vehicle axle from which the installer is positioned. It is then a simple matter for the installer to, either or both, temporarily hold the entire inner structure at an angle or to move it further away from himself in order to avoid having strap 16 become hung up on the vehicle axle. Once strap 16 is hanging vertically, the position of the inner structure can be adjusted such that strap 13 and strap 22 are hanging horizontally from cross links 11 and 12 approximately opposite each other on either side of the tire. Cross link 21 is long enough that it can be reached from off of the ground in front of the tire. The remaining steps in installing tire chain device 10 are described hereinabove.

Hub cap protectors 24, comprised of short lengths of pliable hollow tubing may be mounted on appropriate portions of cross link 19, cross link 21, and tightener chain 23. Strap 22 will not ordinarily come in contact with the hub cap because it is rigid and will extend between points on the curvature of the tire which are sufficiently outboard from the adjacent portion of the hubcap.

Figure 5:
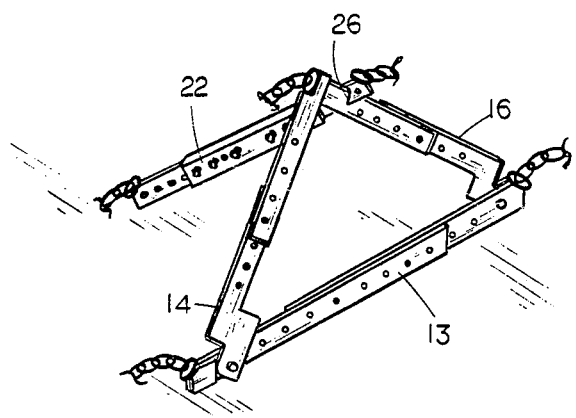
FIG. 5 is a view of the tire chain device of the present invention arranged to form a warning triangle.

To serve as a warning triangle the inner structure comprised of strap 13, 14 and 16 is first set on the ground upside down with respect to its installed orientation. Next, depending straps 14 and 16 are pivoted inwardly, approximately 45 degrees, until their ends come in contact. The tip of their ends may be overlapped in order to maintain an isosceles triangular formation by slightly springing the entire structure. End segment 22b of strap 22 has an angled slot 26 (see FIGS. 1, 2, 4 and 5) near one of its ends which fits over the edge of either strap 14 or 16 near the point at which they contact each other. Thus, straps 14, 16 and 22 form a crude tripod as seen in FIG. 5. The exposed faces of straps 13, 14 and 16 may be painted a light-reflective color in order to better serve the triangular warning function. Having two such tire chain devices 10 normally available, it is possible to set up a warning triangle both in front of and behind a stalled vehicle.

It is believed that all of the advantages and objects mentioned above are accomplished by use of the best mode for carrying out the invention disclosed herein. Obviously, many modifications and variations of the present invention are possible in light of the above teachings. It is therefore to be understood that, within the scope of the appended claims, the invention may be practiced otherwise than as specifically described.

I claim:

1. A tire chain device, comprising:
    first connecting means connecting an end of each of a first pair of cross links in spaced apart relationship;
    two second connecting means connecting an end of each of a second pair of longer cross links to each end of said first connecting means at a point spaced away therefrom and the two second connecting means are adapted for pivoted attachment to said first connecting means, said attachment being limited to place the ends of the first and second connecting means radially outward from the rotational axis of the tire to the extent said ends do not exceed the radial outmost extent of the adjacent sidewall of the tire, said first and two second connecting means adapted for placement on the inside of a wheel; and
    third connecting means connecting the second end of each of the first pair of cross links in spaced apart relationship, said third connecting means having means for removably attaching thereto a link of each of said second pair of cross links, said third connecting means adapted for placement on the outside of the wheel, whereby said first pair of cross links may initially rest atop the wheel while said second pair of cross links may be brought under the wheel and attached to said third connecting means.

2. The tire chain device of claim 1 wherein the first, two second, and third connecting means are rigid straps of approximately the same length, whereby the tire chain device can be installed from behind a wheel substantially covered by a fender by pivoting one of the two second connecting means alongside the first connecting means for placement of the first pair of cross links in position atop the wheel and then dropping the pivoted one of the second connecting means to a position adjacent the sidewall area of the tire on the forward side of the axle.

3. The tire chain device of claim 2 wherein the two second connecting means are shorter than the first and third connecting means, whereby the ease of maneuvering one of the second connecting means over the axle is enhanced.

4. The tire chain device of claim 1, further comprising means for remotely connecting an interior point along each of the second pair of cross links to each other, whereby the first and second pairs of cross links can be tightened at approximately 90° angular spacings around the wheel after the first, two second, and third connecting means have been approximately positioned on the wheel and a link of each second pair of cross links has been attached to said third connecting means.

5. The tire chain device of claim 1 wherein said third connecting means is a rigid strap and said attaching means is a plurality of spaced apart posts having expanded ends, whereby a post will be available for the end link of each of said second pair of cross links which will minimize sag.

6. The tire chain device of claim 5 wherein said first and two second connecting means are rigid straps having means for adjusting their length and said third connecting means has means for adjusting its length, whereby said first and third connecting means can be adjusted to approximately the same length and said two second connecting means can be adjusted to a length somewhat less than that of the first and third, all such lengths depending on the size of the wheel.

7. The tire chain device of claim 5 wherein said third connecting means includes:
    two end portions, each having a plurality of spaced apart threaded holes for the selective positioning of a cooperatively threaded screw;
    a central portion of hollow rectangular cross-section, one vertical side of which has two symmetrically spaced threaded apertures for cooperative receipt of said screw and upon which is mounted said plurality of posts, whereby the length of said third connecting means may be varied while maintaining the centering of pairs of said posts therealong.

8. The tire chain device of claim 4 wherein said means for remotely connecting is further characterized as a chain having a hook on either end, whereby it can be positioned between whichever links of each of the second pair of cross links which will minimize sag.

9. The tire chain device of claim 8 wherein said means for remotely connecting includes two halves with means for operably connecting one to the other at any link therealong.

10. The tire chain device of claim 2 wherein said third connecting means has an angled slot near one end for receiving an edge of one of said second connecting means near its connection to a cross link of said second pair, whereby it can support the first and two second connecting means in the form of a somewhat vertically oriented warning triangle.

11. The tire chain device of claim 10 wherein one contiguous face of each of said first and two second connecting means is painted a light-reflective warning color.

12. A tire chain device, comprising:
    three substantially straight elongated rigid members of substantially equal length, said members having means for being capable of being connected in a triangular relationship;
    an additional rigid member having a slot for receiving an edge of one of said elongated rigid members whereby said additional rigid member can support the three elongated rigid members in the form of a somewhat vertically oriented warning triangle; and wherein said three elongated rigid members in combination with other elements also serve as a tire chain.

13. The tire chain device of claim 12 wherein one contiguous face of each of said three substantially straight elongated rigid members is painted a light-reflective warning color.

* * * * *